(12) United States Patent
Hartmann et al.

(10) Patent No.: US 11,567,470 B2
(45) Date of Patent: Jan. 31, 2023

(54) COMPUTER-AIDED OPTIMIZATION OF NUMERICALLY CONTROLLED MACHINING OF A WORKPIECE

(71) Applicant: Siemens Aktiengesellschaft, Munich (DE)

(72) Inventors: Dirk Hartmann, Assling (DE); David Bitterolf, Erlangen (DE); Hans-Georg Köpken, Erlangen (DE); Birgit Obst, Munich (DE); Florian Ulli Wolfgang Schnös, Munich (DE); Sven Tauchmann, Chemnitz (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 2 days.

(21) Appl. No.: 17/310,300

(22) PCT Filed: Dec. 17, 2019

(86) PCT No.: PCT/EP2019/085655
§ 371 (c)(1),
(2) Date: Jul. 28, 2021

(87) PCT Pub. No.: WO2020/156732
PCT Pub. Date: Aug. 6, 2020

(65) Prior Publication Data
US 2022/0088735 A1   Mar. 24, 2022

(30) Foreign Application Priority Data
Jan. 28, 2019  (EP) .................................. 19153959

(51) Int. Cl.
*G05B 19/402* (2006.01)
*G05B 19/31* (2006.01)

(52) U.S. Cl.
CPC .. *G05B 19/316* (2013.01); *G05B 2219/35167* (2013.01)

(58) Field of Classification Search
CPC ......... B23Q 15/12; B25J 9/1633; B25J 9/163; G05B 19/316; G05B 2219/35167
See application file for complete search history.

(56) References Cited

U.S. PATENT DOCUMENTS

| 2008/0065257 A1 | 3/2008 | He et al. | |
| 2013/0024021 A1* | 1/2013 | Atabey | G05B 19/404 |
| | | | 700/176 |

(Continued)

FOREIGN PATENT DOCUMENTS

| WO | WO 2018019550 A1 | 2/2018 |
| WO | WO 2018041476 A1 | 3/2018 |

OTHER PUBLICATIONS

Wan, Xiao-Jin, et al. "An error control approach to tool path adjustment conforming to the deformation of thin-walled workpiece." International Journal of Machine Tools and Manufacture 51.3 (2011): 221-229. (Year: 2011).*

(Continued)

*Primary Examiner* — Michael D Masinick
(74) *Attorney, Agent, or Firm* — Henry M. Feiereisen LLC

(57) ABSTRACT

In order to be able to take into account machining configurations more flexibly, a method for optimizing numerically controlled machining of a workpiece includes ascertaining geometric interaction data. A relationship between a force to be expected and a configuration parameter of the machining is determined on the basis of the interaction data. The force is calculated during the machining on the basis of the (Continued)

relationship and a current value of the at least one configuration parameter. The machining is adapted depending on the calculated force.

20 Claims, 3 Drawing Sheets

(56) References Cited

U.S. PATENT DOCUMENTS

| | | | |
|---|---|---|---|
| 2015/0127139 A1* | 5/2015 | Bolin | G05B 19/4065 700/173 |
| 2015/0355647 A1* | 12/2015 | Bitterolf | B25J 9/1638 700/275 |
| 2019/0152064 A1 | 5/2019 | Schnös et al. | |
| 2022/0179393 A1* | 6/2022 | Zhang | G05B 19/4065 |

OTHER PUBLICATIONS

Wu, H., et al. "Modelling and real-time compensation of cutting-force-induced error on a numerical control twin-spindle lathe." Proceedings of the Institution of Mechanical Engineers, Part B: Journal of Engineering Manufacture 224.4 (2010): 567-577. (Year: 2010).*

Garcia Barbosa, Jorge Andrés, José Manuel Arroyo Osorio, and Ernesto Córdoba Nieto. "Simulation and verification of parametric numerical control programs using a virtual machine tool." Production Engineering 8.3 (2014): 407-413. (Year: 2014).*

Carri llo F J et al: "1Hybrid Real Time Adaptive PID Control System for Turning", Proceedings of the 1996 IEEE International Conference on Control Applications (CCA), Dearborn [Proceedings of the IEEE International Conference on Control Applications (CCA)], New York, IEEE, US, Bd. CONF. 5, pp. 492-497, XP000741909, ISBN: 978-0-7803-2976-8; 1996.

Uhlmann, Eckart; "2. Vorlesung—Statisches Verhalten", SS 2008—Bearbeitungssystem Werkzeugmaschine II—VL 2, 1., 2008, pp. 1-27, found in the Internet on Dec. 11, 2020 (g) http://www.iwf.tu-berlin.de/uploads/media/WZM_II_VL_02_-_Statisches_Verhalten.pdf.

Uhlmann, Eckart; "5. Vorlesung—Das Maschinengestell", WS Sep. 2008—Bearbeitungssystem Werkzeugmaschine 1—VL 5, 1., 2008, pp. 1-35, gefunden im Internet am Dec. 11, 2020 (g) http://www.iwf.tu-berlin.de/uploads/media/WZM_I_VL_05_-_Das_Maschinengestell.pdf.

Bigras P et al: "New formulation for an industrial robot force controller: Real-time implementation on a KUKA robot", Systems, Man and Cybernetics, 2007. ISIC. IEEE International Conference on, IEEE, PI, pp. 2794-2799, XP031198435, DOI: 10.1109/ICSMC.2007.4413645 ISBN: 978-1-4244-0990-7; 2007.

M. Tomizuka et al:"Modeling and Conventional/ Adaptive PI Control of a Lathe Cutting Process" ;Department of Mechanical Engineering; University of California; Berkeley; CA 94720; Journal of Dynamic Systems; Measurement and Control; AS ME International; US; Bd. 110, Nr. 4; Dec. 1, 1988 ;pp. 350-354; XP008090127; ISSN: 0022-0434.

PCT International Search Report and Written Opinion of International Searching Authority dated Mar. 31, 2020 corresponding to PCT International Application No. PCT/EP2019/085655 filed Dec. 17, 2019.

* cited by examiner

COMPUTER-AIDED OPTIMIZATION OF NUMERICALLY CONTROLLED MACHINING OF A WORKPIECE

CROSS-REFERENCES TO RELATED APPLICATIONS

This application is the U.S. National Stage of International Application No. PCT/EP2019/085655, filed Dec. 17, 2019, which designated the United States and has been published as international Publication No, WO 2020/156732 A1 and which claims the priority of European Patent Application, Serial No. 19153959.2, filed Jan. 28, 2019, pursuant to 35 U.S.C. 119(a)-(d).

BACKGROUND OF THE INVENTION

The invention relates to a method for computer-aided optimization of numerically controlled machining of a workpiece by a tool, wherein Interaction data is ascertained that describes a geometric interaction of the tool with the workpiece in a section of a toolpath, as well as to a computer program for performing such a method. The invention further relates to a control system for numerically controlled machining of a workpiece by a tool and for computer-aided optimization of the machining, which control system has an electronic computing device for ascertaining interaction data and a further electronic computing device, and also to a machine tool having such a control system.

The document WO 2018/019550 A1 describes a method for the computer-aided control of an end element of a machine tool. The method entails detecting a number of optical markers in a working environment of the machine tool and determining a relative pose between the end element and a workpiece. The method determines a correction value on the basis of a comparison of the relative pose with a reference pose. The end element is then controlled for the purpose of machining the workpiece taking into account the first correction value.

The document WO 2018/041476 A1 describes a method for optimizing a workpiece machining process. The method is characterized in that the machining process is simulated with the aid of a predefined workpiece geometry and a sequence of control commands. A characteristic variable of the machining process is ascertained on the basis of the simulation result and checked. If a deviation of the characteristic variable from an optimization variable is established, the simulation is performed again in an adapted manner, repeatedly if necessary; otherwise the sequence of control commands is provided in order to enable production of the workpiece.

Known optimization methods sometimes demand a very high computational overhead, with the result that corresponding calculations or simulations may only be performed prior to the actual machining of the workpiece, i.e. offline. This leads among other things to the requirement for the exact configurations, such as, for example, machine selection, tool selection, chucking conditions of the workpiece, or material parameters, to be defined in advance. The corresponding machining program is therefore optimized for precisely one configuration only, which leads to a considerable limitation of the flexibility of the machining process. On the other hand, it is not possible, due to the high computational overhead, to perform simulations entirely online, i.e. during the machining of the workpiece.

Against this background, it is an object of the present invention to disclose an improved concept for computer-aided optimization of numerically controlled machining of a workpiece by means of a tool, which concept enables a more flexible consideration of different configurations during the machining.

SUMMARY OF THE INVENTION

This object is achieved according to the invention by means of a method, a computer program, a control system and a machine tool according to the independent claims. Advantageous embodiments and developments are the subject matter of the dependent claims.

The improved concept is based on the idea of performing a calculation of forces occurring during the machining of the workpiece that may be referred to in order to fine-tune the machining process, in part offline, i.e. prior to the actual machining of the workpiece by means of a machine tool, and in part online, i.e. during or In parallel with the machining of the workpiece by means of the tool. In the process, purely geometric interactions between tool and workpiece, which are therefore independent of or decoupled from machining configuration parameters such as, for example, the feed rate, are performed offline and provided for the online machining of the workpiece. A relationship between the geometric interactions and a force to be expected can then be determined online, offline, or partially online and partially offline. An actual calculation of the force based on the relationship and a configuration parameter, as well as an adjustment of the machining process, are performed online.

According to an independent aspect of the improved concept, a method for computer-aided optimization of numerically controlled machining of a workpiece by means of a tool is disclosed. The method includes ascertaining, prior to the machining, interaction data describing a geometric interaction of the tool with the workpiece in a section of a toolpath. A relationship between a force to be expected during the machining, in particular during the said section of the said toolpath, and at least one machining configuration parameter is determined based on the interaction data. The force is calculated during the machining based on the relationship and a current value of the at least one configuration parameter during the machining. The machining is adjusted as a function of the calculated force.

The interaction data is in particular purely geometric interaction data.

The interaction data is in particular independent of or decoupled from the at least one configuration parameter.

What may be understood by "computer-aided" here and in the following is that an implementation of the method is embodied in such a way that at least one method step is performed by means of an electronic computing unit, in particular by means of a microprocessor or an integrated computer system.

The toolpath, also known simply as track, path or tool trajectory, describes a course through space, in particular a desired course or target course, of the tool during the machining, in particular of a position and/or an orientation of the tool. The toolpath is present in particular in discrete form. The section of the toolpath corresponds for example to an area around a discrete point of the toolpath. Alternatively, the section may correspond to an area between two adjacent or non-adjacent discrete points of the toolpath or around a number of discrete points of the toolpath. In particular, the section is a spatial section, as opposed to a temporal section, which means that the geometric interaction of the tool with the workpiece is independent of configuration parameters, such as, for example, a feed rate or a tool speed during the actual machining.

The geometric interaction of the tool with the workpiece involves in particular a geometric interaction of one or more cutters of the tool with the workpiece.

The geometric interaction includes information about whether one or more cutters of the tool in the section come into contact with the workpiece, and if so, which of the cutters and at which point of the cutters. In this case, a point of a cutter may be characterized for example by a longitudinal coordinate or a longitudinal parameter along a longitudinal axis of the workpiece and an azimuthal or angular coordinate or an azimuthal or angular parameter along a circumference of the tool, in particular in a plane perpendicular to the longitudinal axis of the tool. The longitudinal axis of the tool corresponds for example to a rotational axis of the tool, in particular when the tool rotates around the rotational axis during the machining, such as in the case of a milling tool, for example.

The machining of the workpiece entails in particular a stock-removing machining process, for example involving a stock-removing machining operation by means of a rotating tool and/or a rotating workpiece. It may for example be a milling machining process, a lathe machining process, a drilling machining process or a grinding machining process.

The force to be expected relates for example to a force acting on the tool during the machining and consequently acting on a machine tool, which force results from the interaction of the tool with the workpiece or, synonymously to a force acting on the workpiece during the machining.

The relationship between the force to be expected and the at least one machining configuration parameter is in particular a mathematical relationship, for example an explicit mathematical relationship, such that the force is specified as a function of the at least one configuration parameter, or it is an implicit relationship, such that a function of the force is equal to a function of the at least one configuration parameter. The relationship between the force to be expected and the at least one configuration parameter may be determined entirely offline or partially offline and partially online.

"Offline", as used here and in the following, means that the corresponding step is performed not during an actual machining of the workpiece by the tool but in particular prior to the actual machining. Analogously, "online", as used here and in the following, means that the corresponding step is performed during or in parallel with the actual machining of the workpiece.

Since the force is calculated based on the determined relationship and a current value of the at least one configuration parameter during the machining, this calculation takes place "online", just like the adjustment of the machining process as a function of the calculated force.

The current value of the at least one configuration parameter is a value of the at least one configuration parameter at a point in time at which the tool is located in the said section during the actual machining. Depending on which parameters the at least one configuration parameter comprises, one or more parameters of the at least one configuration parameter may be constant during a part of or the entire machining of the workpiece or, as the case may be, during the traversal of the toolpath or may change, for example dynamically, during the machining.

The machining of the workpiece is optimized by the adjustment of the machining process as a function of the calculated force. This advantageously enables an improvement in quality to be achieved in the fabrication of the workpiece because adapting the machining enables effects of forces occurring during the machining, which cannot be taken into account during a planning of the toolpath or were not taken into account due to the high numeric computational overhead, to be subsequently taken into account online. This can be advantageous in particular when high forces occur during the machining, for example in the case of materials that are difficult to machine, which may result in an elastic deformation of the machine tool and for example a significant deviation of an actual toolpath from the planned toolpath. However, the deviation from the desired toolpath may in turn lead to a deviation of final workpiece dimensions from target dimensions, for example to a violation of geometric and/or dimensioning tolerances, which is associated with a reduction in product quality.

It is particularly advantageous according to the method based on the improved concept that the adjustment is performed online during the machining, and consequently not just the quality of workpieces that are to be machined subsequently in the course of an iterative procedure may be improved, but also the quality of the workpiece currently being machined. Workpiece wastage can be reduced as a result.

A further advantage is produced on account of the fact that the calculation of the forces based on the relationship and a current value of the at least one configuration parameter is likewise performed online during the machining. As a result, an actual value of the configuration parameter may also be specified immediately prior to the machining, in particular at a time at which the geometric interaction data has already been determined. The configuration parameter can also be changed online during the machining. This leads to a significant increase in the flexibility of the machining process.

According to at least one embodiment of the method, the current value of the at least one configuration parameter is specified prior to the machining.

According to at least one embodiment of the method, the configuration parameter is changed during the machining.

According to at least one embodiment of the method, the configuration parameter for calculating the force during the machining is determined during the machining, in particular measured or read out from a memory.

Because the interaction data is assigned to the section that is a spatial, not a temporal section, configuration parameters such as, for example, a feed rate or a tool or workpiece speed can be changed online during the machining.

Because important parts of the optimization, in particular the calculation of the force, take place online, there is advantageously no necessity to hold very large volumes of data available in reserve, as would be the case for example if an optimization were to be performed entirely offline.

Furthermore, although support for the machining or optimization according to the improved concept is possible by means of sensor monitoring during the machining, it is not required in such a complicated and detailed form as would be the case for example for an optimization method that is performed entirely online.

According to at least one embodiment of the method, the interaction data is ascertained and then stored in order to be available during the machining.

According to at least one embodiment, the method steps of ascertaining interaction data, determining the relationship, calculating the force and adjusting the machining are performed for further sections of the toolpath, for example for all sections, i.e. for the entire toolpath.

According to at least one embodiment, the method includes a path planning step during which the toolpath is determined. The interaction data is ascertained during the path planning, for example.

According to at least one embodiment of the method, the at least one configuration parameter comprises a feed rate of the workpiece or of the tool, a rotational speed of the tool, or a position of the tool or workpiece, in which case the position may include in particular one or more Cartesian positions and/or one or more orientations or angular positions.

According to at least one embodiment, the at least one configuration parameter comprises one or more material properties of the workpiece or tool.

According to at least one embodiment, the adjustment of the machining comprises a correction or partial correction of the toolpath and/or an adjustment of one or more of the at least one configuration parameter.

According to at least one embodiment, the tool and the workpiece are each represented by suitable mathematical models for the purpose of determining the interaction data.

According to at least one embodiment, the tool is represented by a point cloud for the purpose of determining the interaction data, i.e. a geometry of the one or more cutters is represented by individual discrete points.

According to at least one embodiment, the workpiece is represented by means of a voxel model for the purpose of determining the interaction data, i.e. by means of a uniform and regular coverage or a coverage fitted to the variable workpiece geometry by means of a grid composed of hexahedra or cuboids or cubes.

According to at least one embodiment, the workpiece is represented by means of a dexel (depth pixel) model for the purpose of determining the interaction data.

Both in the dexel model and in the voxel model or in other suitable models, the workpiece is represented and approximated by a plurality of geometric elements for the purpose of determining the interaction data.

According to at least one embodiment, the ascertaining of the interaction data comprises an intersecting of a simulated tool with a simulated workpiece. The intersecting comprises a Boolean operation, for example. This entails for example identifying elements of the workpiece that come into contact with or are cut by points of the modeled or simulated tool during the section of the toolpath.

The simulated tool in this case corresponds for example to a simulation of the tool and the simulated workpiece corresponds to a simulation of the workpiece.

According to at least one embodiment of the method, a chip thickness to be expected during the machining is established and the relationship between the force to be expected and the at least one configuration parameter is determined based on the established chip thickness. The chip thickness is in particular a chip thickness during the section.

The chip thickness is a variable which can have a significant influence on a cutting force during the machining. Taking the chip thickness into account therefore results in an increased precision in the determination of the relationship or in the force calculation.

In particular, the interaction data may be ascertained entirely offline. The interaction data may be ascertained for example by means of a computer-aided manufacturing (CAM) system.

This advantageously enables a computational overhead that it would not be possible to provide online, or that it would be possible to provide only with increased investment of resources, to be decoupled from the machining of the workpiece and the calculation of the force during the actual machining.

According to at least one embodiment, the interaction data is ascertained at least to some extent using a graphics processing unit (GPU), in particular a GPU of the CAM system. In particular, computing steps for ascertaining the interaction data are performed by means of the GPU.

Using GPUs for technical simulations is also referred to as GPGPU (general-purpose computing on graphics processing units). An advantage in using a GPU for specific or all computing steps for ascertaining the interaction data resides in the fact that high-performance GPUs, by virtue of their architecture, work particularly efficiently in certain computing operations. In particular for the parallel execution of uniform tasks, as also occur in the ascertaining of the interaction data, GPUs, which may have higher computing power and memory bandwidths in this regard compared to CPUs, are particularly advantageous. In particular, typical CAM systems feature powerful GPUs in any case, which may advantageously also be called upon here at least to some extent for the purpose of ascertaining the interaction data.

This enables the interaction data to be calculated in a particularly efficient and parallel manner. Known software libraries can be used for this purpose, for example.

According to at least one embodiment, the relationship between the force to be expected and the at least one configuration parameter is determined at least in part prior to the start of the machining, i.e. at least partially offline.

Advantageously, the greater the proportion of computing operations performed offline, the lower is the computational overhead online. On the other hand, the greater a proportion of operations performed online, the greater is the flexibility in terms of the actual configuration during the machining. A method according to the improved concept advantageously permits the advantages to be weighed.

According to at least one embodiment, the adjustment of the machining comprises a correction of the toolpath or of a tool trajectory or of the feed rate or of a tool or workpiece rotational speed.

This advantageously enables an improvement in quality, including of the workpiece currently being machined, to be achieved by an online compensation for possible deviations from the toolpath.

According to at least one embodiment of the method, the latter also includes an acquisition of sensor data during the machining process and an adjustment of the relationship or of a model for calculating the force as a function of the acquired sensor data.

The sensor data may be for example output data from sensors mounted on the machine tool, in particular mounted externally on the machine tool, or from sensors for detecting internal electrical variables of the machine tool, of a drive of the machine tool, for example. The sensor data may correspond for example to a motor current or spindle current of a drive of the machine tool, to material parameters of the workpiece or tool, to tool positions or orientations, to workpiece positions or orientations, or to variables for estimating a wear condition of the tool.

In this way, the accuracy of the force determination, in particular of the determination of the relationship or calculation of the forces can be further increased and consequently a further improvement in the quality of the machining can be achieved.

According to at least one embodiment, a deviation of an actual position of the tool during the machining from a target position according to the corrected toolpath is determined as a function of the sensor data. The relationship is modified or the model adapted as a function of the deviation of actual position and target position.

It should be noted in this context that the corrected toolpath may conceivably be identical to the original toolpath, for example if the calculated forces reveal no necessity to adjust the toolpath.

According to at least one embodiment, the toolpath is corrected as a function of one or more stiffness values of the machine tool for performing the machining.

The higher the static or frequency-dependent stiffness and damping of the machine tool, the lower may be an influence of the forces occurring during the machining and the smaller may be an expected deviation from the desired toolpath. The stiffness values may for example be permanently stored and retrieved or measured. A more precise adjustment of the machining or correction of the toolpath is possible by taking the stiffness values into account. Furthermore, taking the stiffness values into account also enables machine tools having lower stiffness to be used.

By a "machine tool", as used here and in the following, is understood a machine for manufacturing workpieces by means of tools. This includes in particular conventional NC-controlled, in particular CNC-controlled, machines as well as robots, in particular industrial robots and CNC-controlled industrial robots, which are able to guide a tool for the purpose of machining the workpiece.

According to a further independent aspect of the improved concept, a computer program is disclosed which comprises commands which cause the program to perform a method according to the improved concept when said program is executed by a computer system, which for example includes one or more computers or electronic computing devices.

The computer system or the electronic computing devices may for example comprise an NC or CNC controller. Commands that are executed by the NC or CNC controller lead in particular to the performing of at least the method steps of calculating the force based on the relationship and the current value of the at least one configuration parameters, as well as of adjusting the machining as a function of the calculated force.

The computer system or the electronic computing devices may for example comprise a computing device of a CAM system. Commands executed by the computing device of the CAM system lead in particular to the performing of at least the method step of ascertaining the interaction data.

According to a further independent aspect of the improved concept, a computer-readable memory system, in particular comprising one or more computer-readable media, is disclosed. The computer-readable media comprise commands which, when executed by a computer system, cause the latter to perform a method according to the improved concept.

According to a further independent aspect of the improved concept, a control system for the numerically controlled machining of a workpiece by a tool and for the computer-aided optimization of the machining is disclosed. The control system comprises an electronic computing device configured to ascertain interaction data describing a geometric interaction of the tool with the workpiece in a section of a toolpath. The control system also comprises a further electronic computing device. The electronic computing device and/or the further computing device are/is configured to determine a relationship between a force to be expected during the machining and at least one configuration parameter of the machining based on the interaction data. The further electronic computing device is configured to calculate the force based on the relationship and a current value of the at least one configuration parameter during the machining and to adjust the machining as a function of the calculated force.

The adjustment of the machining by means of the further electronic computing device may for example include or consist of the generation of control commands for controlling the tool.

According to at least one embodiment of the control system, the further computing device is configured to control the tool during the machining without the computing device, i.e. to control the tool independently, in particular for the purpose of machining the workpiece. In particular, the further computing device can perform the force calculation and the adjustment of the machining for this purpose.

According to at least one embodiment of the control system, the electronic computing device has a graphics processing unit (GPU) for the purpose of ascertaining the interaction data. The electronic computing device is configured to ascertain the interaction data by means of the graphics processing unit.

According to at least one embodiment of the control system, the at least one configuration parameter for calculating process forces during the machining is adapted on the basis of sensor data measured online.

According to a further independent aspect of the improved concept, a machine tool for the numerically controlled machining of a workpiece by a tool is disclosed. In this case the machine tool has a control system according to the improved concept.

According to at least one embodiment of the machine tool, the machine tool has a system for computer-aided manufacturing (CAM system) which comprises the electronic computing device. The machine tool additionally has a numerical controller (NC controller) which comprises the further electronic computing device.

Further embodiment variants of the control system may be derived directly from the different embodiments of the method according to the improved concept, and vice versa. Further embodiment variants of the machine tool may be derived directly from the different embodiments of the method according to the improved concept, and vice versa.

BRIEF DESCRIPTION OF THE DRAWING

The invention is explained in more detail below with reference to actual exemplary embodiments and associated schematic drawings. In the figures, like or functionally like elements are labeled with like reference signs. It may be that the description of like or functionally like elements is not necessarily repeated in different figures.

In the figures.

DETAILED DESCRIPTION OF PREFERRED EMBODIMENTS

Figure 1:
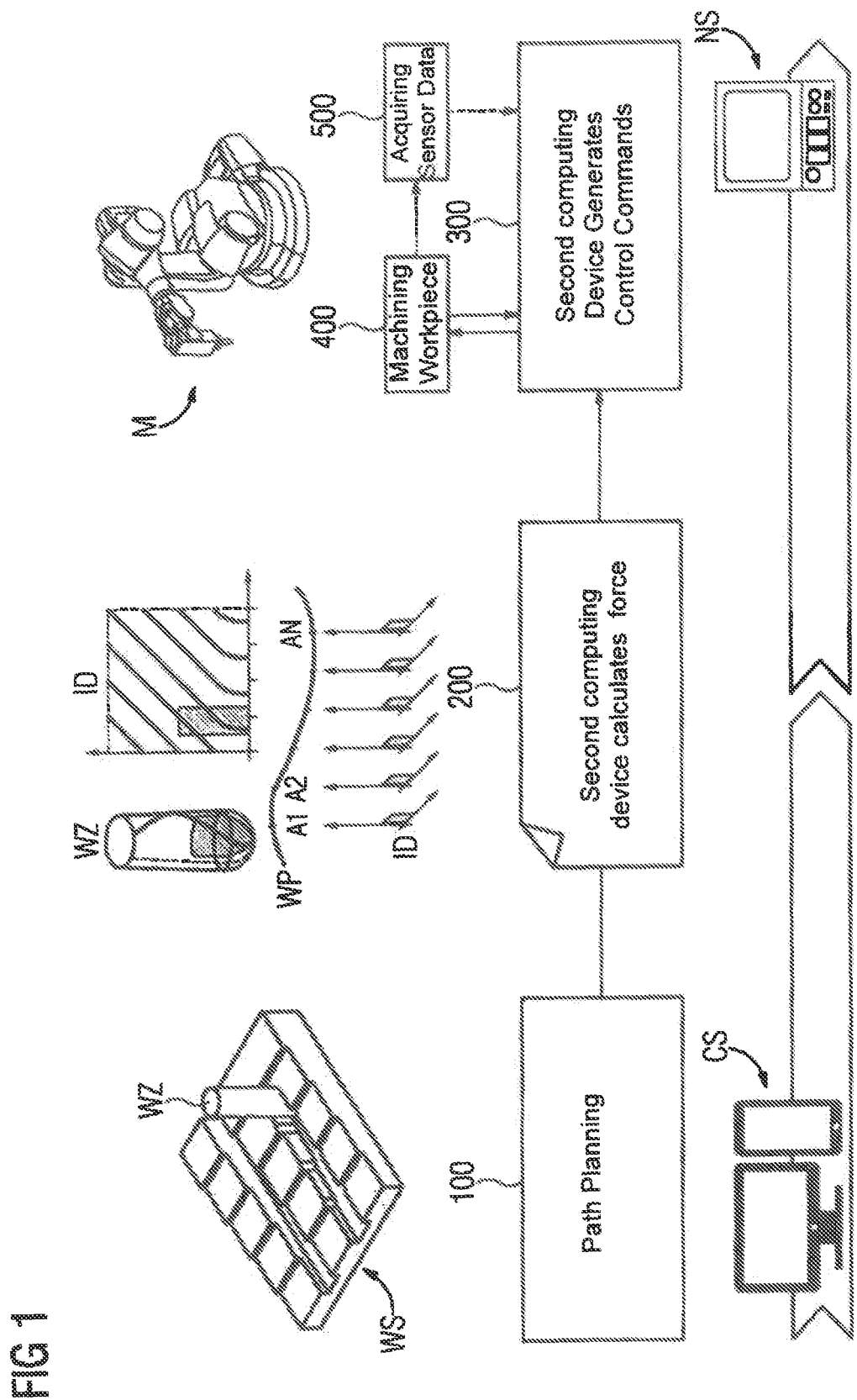
FIG. 1 shows a schematic view of different components of an exemplary embodiment variant of a control system and a machine tool according to the improved concept, as well as steps of an exemplary embodiment of a method according to the improved concept.
Figure 2:
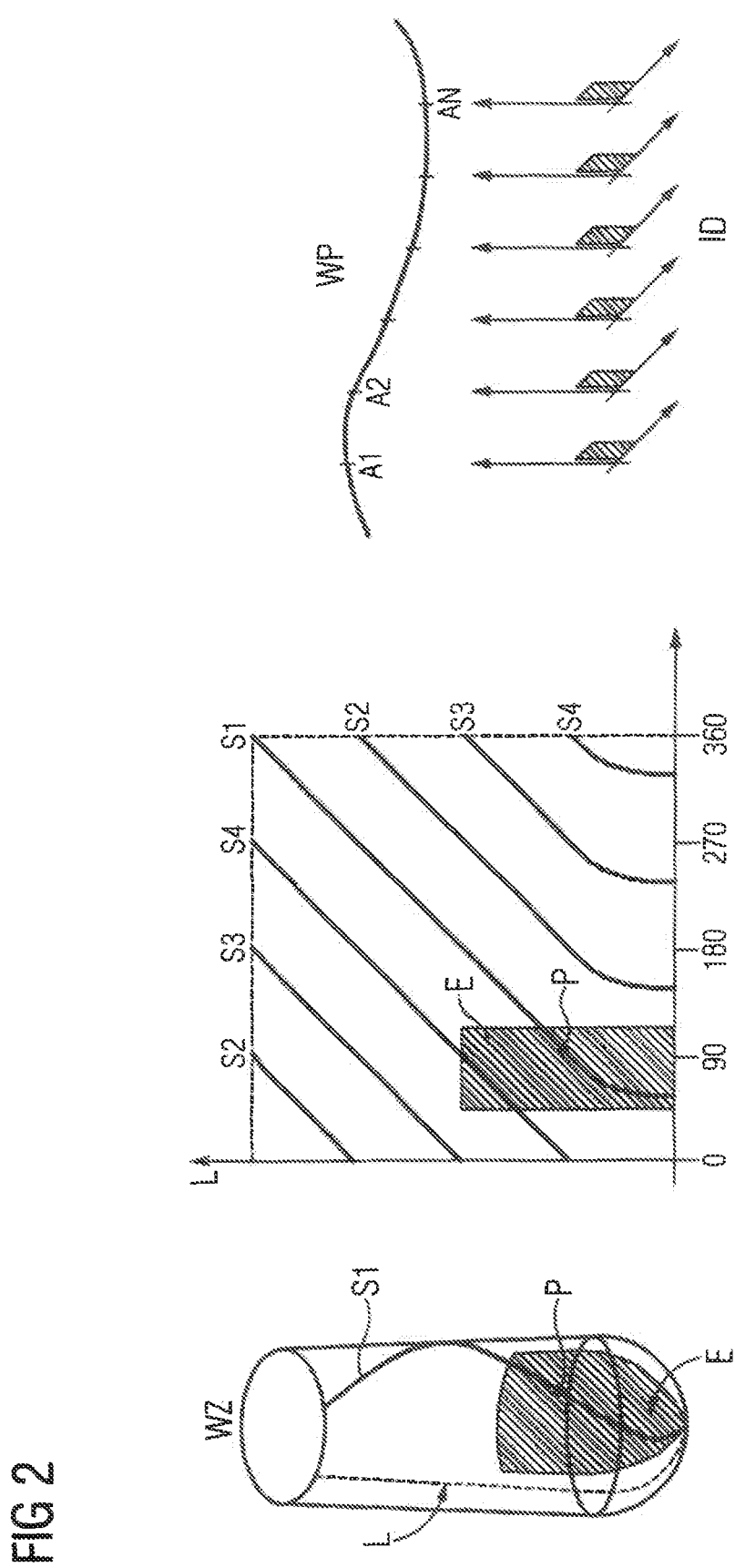
FIG. 2 shows a schematic view of different aspects of an exemplary embodiment variant of a method according to the improved concept.

Various components of a control system or of a machine tool according to the improved concept are shown schematically in FIG. 1 in the context of different steps of a method according to the improved concept. Different aspects of the method are shown in FIG. 2.

The control system comprises an electronic computing device CS, for example a CAM system, as well as a further electronic computing device NS, for example an NC, CNC or robot controller. The machine tool comprises the control system and a machine M, which is embodied for example as an industrial robot or conventional machine tool in the narrower sense.

A toolpath WP for the machining of the workpiece WS by means of the machine M may be planned by means of the computing device CS on the basis of target specifications for a workpiece WS, in particular geometric target specifications, as well as geometric dimensions and properties of a tool WZ. The toolpath WP in this case comprises spatial information relating to how the tool WZ and/or the workpiece WS are to be guided through the machine M in order to achieve the target specifications for the workpiece WS. The toolpath or tool trajectory WP may be represented in particular by means of discrete points, circular arcs and/or splines each having associated feed rate and machine parameters, wherein one section A1, A2, . . . AN in each case may be assigned to one or more of the discrete points.

Computing operations performed by the computing device CS are executed offline, i.e. prior to a machining of the workpiece by the machine M. Computing operations performed by the further computing device NS are executed online, i.e. during or in parallel with the machining of the workpiece WS by the machine M.

According to a method based on the improved concept, interaction data ID is ascertained offline, for example by means of the computing device CS, in a step 100. The interaction data ID describes a geometric interaction, in particular a purely geometric interaction, of the tool WZ with the workpiece WS during one or more of the sections A1 to AN. Step 100 may be for example part of a path planning by the CAM system CS. In order to determine the geometric interaction of the tool WZ with the workpiece WS, i.e. to ascertain the interaction data ID for one of the sections A1 to AN, the tool WZ, in particular a cutter S1 of the tool WZ, as shown in the left part of the illustration in FIG. 2, is represented in a suitable mathematical manner, for example by means of a point cloud. In other words, a geometry of the cutter S1 is mapped by means of individual points. The same applies to optional further cutters S2, S3, S4 (not shown on the left in FIG. 2).

The workpiece WS is also characterized by means of a suitable mathematical representation. In particular, the workpiece WS is subdivided into a plurality of geometric subunits or elements and thus represented approximately. The elements of a workpiece may be for example hexahedra, cubes, cuboids or different, including irregular, geometric bodies.

For example, the workpiece WS may be characterized by means of a voxel model in which it is represented by a uniform or regular coverage or a coverage fitted to the workpiece geometry by means of a grid composed of hexahedra, cuboids or cubes. In alternative embodiment variants, the workpiece WS may be represented as a dexel model, for example. Other models from the prior art are also possible. It may be advantageous, in particular when using the cited mathematical models, to ascertain the interaction data by means of a graphics processing unit (GPU), the CAM station CS, for example. Graphics processing units may be particularly suitable and efficient on account of the data structure and the computing operations to be performed.

In order to determine the interaction data ID, the tool WZ is intersected with the workpiece WS. This means that the models for the tool WZ and the workpiece WS are subjected to Boolean operations. For example, such geometric subelements of the workpiece WS are identified and so to speak removed which come into contact with or are cut by points of the tool WZ.

The interaction data ID may then be represented for example in the form of engagement histograms, as shown in the middle part of FIG. 2, and stored. In the exemplary engagement histogram of FIG. 2, an azimuthal angle of the tool WZ, i.e. an angle that describes a position on a circumference of the tool WZ, in particular from 0 to 360 degrees, is plotted on the horizontal axis. A longitudinal position along a suitably parameterized longitudinal path L of the tool WZ, as shown in the left part of FIG. 2, is plotted for example on the vertical axis. A point on a surface of the tool WZ, in particular a point of a cutter S1, S2, S3, S4 is uniquely identified by the specification of the azimuthal angle and the longitudinal position. The engagement histogram plots the depths of cut or contact surfaces for example from 0 to 360 degrees and via the longitudinal position of the cutters S1, S2, S3, S4. In the engagement histogram, the thus defined coordinates of the cutters S1 to S4 are represented by lines designated by the reference signs of the cutters S1 to S4. An exemplary point P on the cutter S1 of the tool WZ is depicted in the left part of FIG. 2 and its coordinates, defined as described, are shown in the engagement histogram.

An engagement zone E is shown by hatching in the left part of FIG. 2. The engagement zone E corresponds to an area on a surface, in particular a notional surface, of the tool WZ at which the tool WZ would theoretically come into contact with the workpiece WS during the section of the toolpath if the entire surface of the tool WZ were to represent a cutter (lateral surface). In actual fact, an engagement takes place only at that point where the zone E comes into contact with the cutter S1 or with a further cutter S2, S3, S4. The engagement zone E is also shown in the engagement histogram in the center of FIG. 2, in this case in simplified form as a rectangular area.

As can be seen in the engagement histogram, in the relevant section of the toolpath WP under consideration, the zone E overlaps with the cutter S1 as well as with the cutter S4. The geometric interaction of the tool WZ with the workpiece WS during the section of the toolpath WP may be represented and stored in this form. During step 100 of the method, corresponding engagement diagrams are generated and stored for several, in particular for all, sections A1, A2 . . . AN of the toolpath WP, as indicated in the righthand part of FIG. 2. The interaction data ID is therefore available for example along the toolpath WP on the basis of the engagement histograms.

Because the interaction data ID is assigned to spatial and not temporal positions of the tool WZ, these are not dependent on configuration parameters such as, for example, a feed rate during the actual machining of the workpiece WS. A change in feed rate is therefore possible at any time.

In various embodiment variants, interaction data ID may be generated during step 100 not just for one combination composed of a tool WZ and a workpiece WS, but corresponding interaction data may be generated for a plurality of different combinations of different tools and workpieces.

Furthermore, for example likewise during step 100, the ascertained and stored interaction data ID is used in order to determine a relationship between a force to be expected during the machining, which force acts in particular on the tool WZ, and at least one machining configuration parameter. In particular, discretized chip thicknesses for the corresponding section may be determined for this purpose.

The configuration parameter may be a feed rate, for example. In an embodiment variant, the relationship between the force to be expected and the feed rate is determined in such a way that an expression is obtained in which the force is parametrically dependent on the feed rate, for example henceforth only on the feed rate. In alternative embodiment variants, the relationship may be parametrically dependent on other or further configuration parameters in addition to or instead of the feed rate, for example on a tool speed.

In addition to determining the chip thickness, the determination of the relationship may also include determining further process force parameters containing the feed rate and/or the tool speed and/or further configuration parameters still in parameter form.

Known mathematical computing methods may be employed for determining the relationship, as described for example in the publication "Altintas Y.: Manufacturing Automation: Metal Cutting Mechanics, Machine Tool Vibrations and CNC Design. Cambridge University Press 2000" (hereafter "Altintas 2000") or the publication "Engin S., Altintas Y.: Generalized modeling of milling mechanics and dynamics: Part I—Helical end mills. CIRP Annals—Manufacturing Technology (2001) 50, pp. 25-30." (hereafter "Engin 2001").

In a step 200 of the method, the determined relationship and/or the interaction data ID are transferred to the further computing device NS, in particular in the form of a standardized format for machine code such as G-code.

In a step 300 of the method, for example, the further electronic computing device, in particular NC controller, NS generates one or more control commands and transmits these for example to the machine M for the purpose of machining the workpiece WZ in a step 400 of the method. In step 200, according to the improved concept, the further computing device NS calculates the force based on the previously determined relationship of the force to be expected with the configuration parameter, for example the feed rate, online during the machining of the workpiece WS. Depending on the result of the calculation, the further computing device NS adjusts the machining, in particular the control commands, in order to optimize the machining of the workpiece WS. The adjustment of the machining may for example include adjusting the toolpath WP in order to compensate for a deviation from a desired target dimension of the workpiece WS in spite of possibly occurring potentially high forces. In particular, the further computing device NS may make reference to one of more stiffness values of the machine M for the compensation. The lower the stiffness of the machine M, the greater is generally the probability of such deviations and the more important is the compensation of the same in order to enable a sufficiently high workpiece quality to be achieved.

Various embodiment variants of the method include an optional step 500 in which sensor data from sensors (not shown) mounted for example on the machine M is acquired and transmitted to the further computing device NS. With the aid of the acquired sensor data, the further computing device NS is able for example to adjust the machining even more precisely and/or to modify the relationship between the force to be expected and the at least one configuration parameter so that a higher accuracy is achieved. In particular, the sensors may comprise position or orientation sensors which detect a deviation of an actual toolpath of the tool WZ from a desired toolpath, which for example takes into account the force calculated according to the relationship. Alternatively or in addition, the sensors can detect electrical variables of a drive of the machine M, for example currents, in particular motor currents and/or spindle currents of a drive of the machine M, and, based on these, adjust the machining or adapt the relationship between force to be expected and configuration parameter.

In various embodiments, mathematical methods for calculating the force may be based at least to some extent on empirical formulae and process force parameters, as described for example in Altintas 2000 or Engin 2001.

In the above-described example, both the interaction data ID and the relationship between the force to be expected and the at least one configuration parameter are determined offline by means of the computing device CS to such an extent that only the at least one configuration parameter, in particular the feed rate, remains as parameter in the relationship. By contrast, the force was calculated online by means of the further computing device NS based on the relationship and the current value of the configuration parameter. This separation affords an increased flexibility compared to known approaches since the at least one configuration parameter can be specified or changed shortly before the machining or even during the machining and the interaction data ID, or the relationship between force and configuration parameter, fittingly models the occurring forces as previously. Furthermore, a computational overhead during the machining is minimized as a result, since the relationship between force and feed rate or other configuration parameters is already established during the machining and only actual values of the parameters or factors still need to be taken into account.

In alternative embodiment variants, at least parts of the determination of the relationship between the force to be expected and the configuration parameter(s) are likewise performed online by means of the further computing device NS. In one case, only the determination of the interaction data ID takes place offline and all further method steps take place online. This separation affords a maximum flexibility during the machining since only purely geometric information relating to the tool WZ and the workpiece WS is specified prior to the machining. On the other hand, the computational overhead during the machining increases as a result.

In further embodiment variants, intermediate steps in the determination of the relationship may therefore be performed offline, in particular for each of the sections A1 to AN, and stored along the toolpath WP or transferred to the further computing device NS. In this way it is possible, depending on available resources, priorities or other conditions during manufacture, to offset the necessary online computational overhead against a necessary flexibility during the machining.

For the method, an exact geometry of the tool WZ for determining the interaction data ID can be provided for example in encrypted form, for example in order to prevent unauthorized leakage of information to third parties. The same applies also to other sensitive data.

Figure 3:
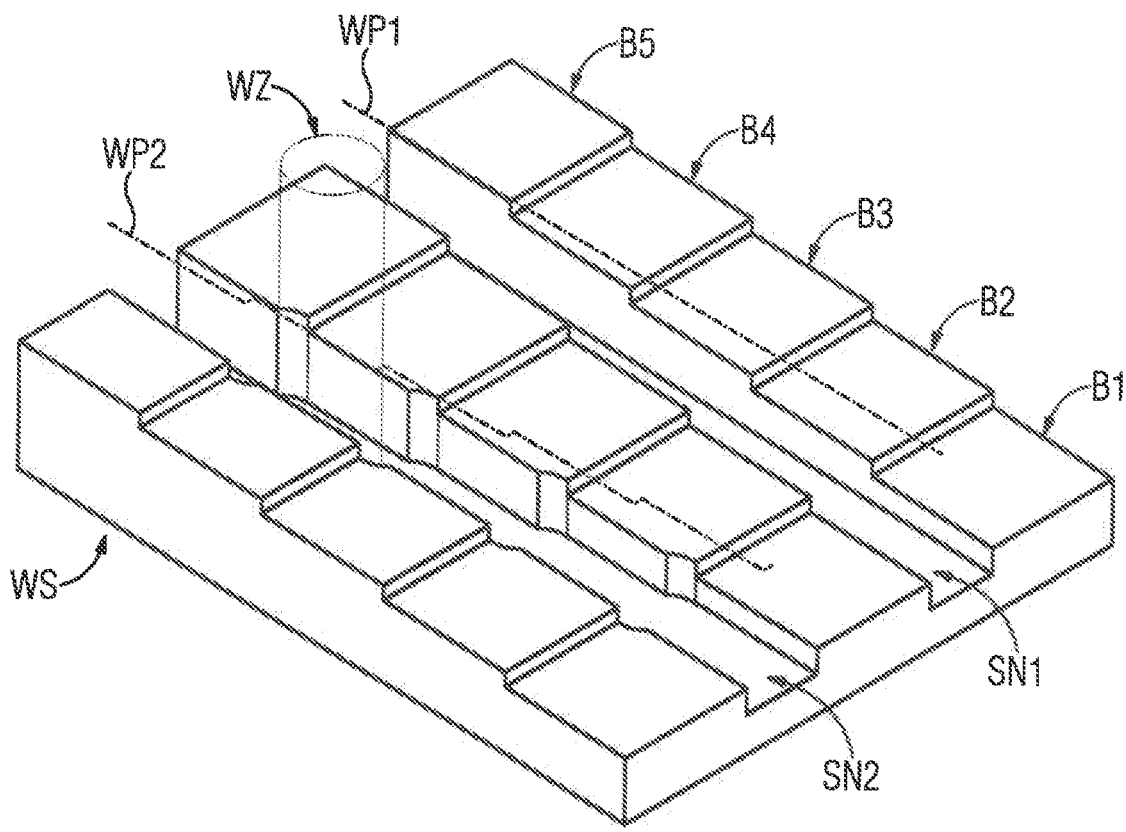
FIG. 3 shows a schematic view of a workpiece which has been machined in part according to an exemplary embodiment variant of a method according to the improved concept.

FIG. 3 shows by way of example a schematic view of a workpiece WS which has been produced using a conventional CNC milling method as well as by means of a method optimized according to a method based on the improved concept.

The workpiece WS is embodied as a stepped workpiece, i.e. It features a plurality of areas B1, B2, B3, B4, B5 which have different but in each case constant heights. In addition, the workpiece WS has for example a rectangular basic shape. The actual shape of the workpiece WS serves for explanation purposes only and is to be understood solely as an example that is in no way limiting.

An objective of the machining in the present example is a straight cut through the workpiece WS, the cut being made through the different areas B1 to B5. A first cut SN1 has been performed according to a method which has been optimized by means of a method according to the improved concept. Reference is made in this regard in particular to the statements made with reference to FIG. 1 and FIG. 2. During the machining, the force acting on the tool WZ was repeatedly calculated in the manner described and the machining was adapted in such a way that the toolpath was adjusted in order to compensate for deviations from a desired toolpath, in other words the straight cut. The resulting actual toolpath WP1 corresponds in a very good approximation to a straight line.

Figure 4:
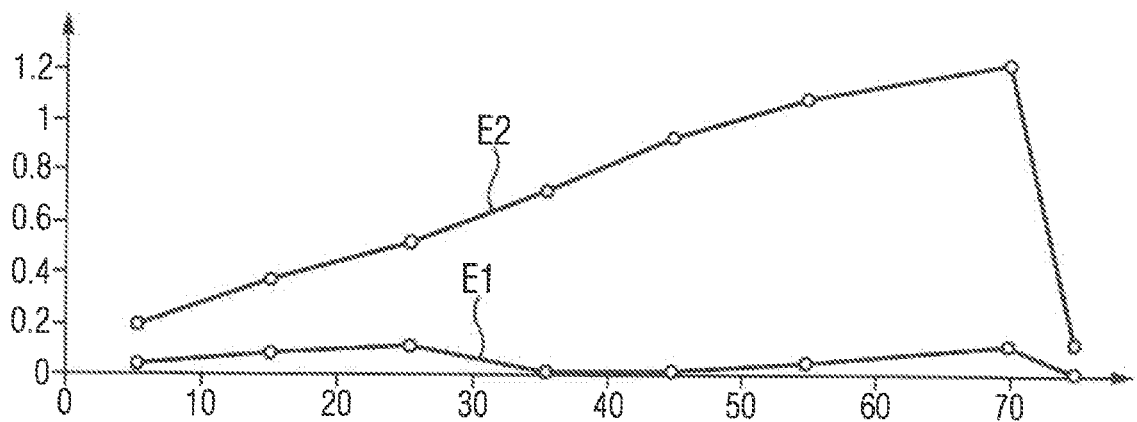
FIG. 4 shows a schematic view of an error parameter during the machining of a workpiece according to an exemplary embodiment variant of a method according to the improved concept.

An associated deviation E1 of the actual toolpath WP1 from the straight cut is plotted in FIG. 4. A position along a cutting axis of the workpiece WS is plotted here on the horizontal axis, in mm for example, and a deviation of the actual toolpath from the straight cut, likewise in mm for example, is plotted on the vertical axis. In the example shown, the magnitude of the error E1 moves across the entire first cut SN1 in a range that is much less than 0.2 mm.

FIG. 3 shows a further cut SN2 which has been produced by means of a conventional milling method. Because of the different heights of the areas B1 to B5, a force acting on the tool WZ changes along the cut SN2, i.e. along the corresponding toolpath WP2. As a result, a deviation from the straight cut occurs, for example perpendicularly to the cutting axis, which deviation is all the greater, for example, the greater the height of the respective area B1 to B5. Since a machine tool always has a stiffness of finite magnitude and, in the absence of appropriate compensation, this leads to deviations from the second toolpath WP2 which are all the greater, for example, the greater the height of the respective area B1 to B5.

The resulting cut SN2 deviates much more strongly from the desired toolpath than the first cut SN1. This is also illustrated in FIG. 4, where a second error E2 is plotted which, analogously to the error E1, represents a deviation, in mm for example, of the actual toolpath WP2 from the straight cut along the cutting axis. As can be seen, the error E2 increases continuously along the toolpath WP2 and reaches a maximum value of approx. 1.2 mm.

As described, the manufacturing quality of a numerically controlled workpiece machining process can be improved according to the improved concept, a higher flexibility of the machining being provided.

Because the stiffness of the machine tool can be explicitly taken into account and compensated for, cost savings can be achieved in respect of procurement, installation or floorspace requirements of machine tools. An increased flexibility is also achieved in terms of workspace or mobility, for example, in particular when deploying industrial robots, whose limited stiffness can be compensated for. In various embodiment variants, the described optimization represents a closed-loop control system, which includes a prediction of the physical behavior of tool or workpiece or machine tool by means of models and consequently can anticipate possible deviations. By dividing the calculation into an online and an offline part, a high-precision adjustment of the machining is possible without the necessity for very high computing requirements during the machining of the workpiece. Manual corrections, for example by modifying a machine code after manufacture of a component, can be dispensed with.

Performing the calculation during the process enables different parameters, for example a position of the workpiece or a choice of the machine or a feed rate, to be specified shortly before the machining process. By optional combinations with appropriate sensor arrangements it is even possible to determine parameters during the process, for example specific material-dependent process force parameters, so that complex and time-consuming calibration operations with corresponding trial cuts are no longer necessary.

Various embodiment variants employ a comparison of process forces, motor torques and spindle torques simulated prior to the machining with motor and spindle torques measured during the machining of the workpiece.

By taking multiple workpiece-tool combinations into consideration, it becomes possible to run the same program code on a number of machines, thus allowing a flexible choice of machine tool.

The described offline calculations may, as described, be performed on CAM systems. Alternatively, offline calculations by means of a cloud platform, on NC/RC controller-oriented hardware or directly on an NC/RC controller, are conceivable.

By compensating for mechanical displacements due to a finite stiffness of the machine tool by means of the described simulation-based controllers it is possible on the one hand to make use of more cost-effective machines and on the other hand to exploit the dynamics of complex kinematic chains, e.g. of industrial robots, and consequently realize more complex toolpaths or larger workspaces.

Such a flexible deployment of mechanical systems, for example robots, implies advantages such as a greater complexity of the products on account of greater freedom of movement, for example more complex undercuts or larger workspaces.

The invention claimed is:
1. A method for computer-aided optimization of numerically controlled machining of a workpiece with a tool of a machine tool, the method comprising:
  prior to commencement of the numerically controlled machining, determining interaction data that describe a geometric interaction of the tool with the workpiece in a section of a toolpath;
  based on the interaction data, determining a relationship between a force to be expected during the numerically controlled machining and at least one machining configuration parameter;
  calculating the force during the numerically controlled machining based on the relationship and a current value of the at least one configuration parameter during the numerically controlled machining; and adjusting the numerically controlled machining as a function of the calculated force by correcting the toolpath as a function of one or more stiffness values of the machine tool.

2. The method of claim 1, further comprising:
determining a chip thickness to be expected during the numerically controlled machining; and
determining the relationship based on the established chip thickness.

3. The method of claim 1, wherein the interaction data are determined using a graphics processor.

4. The method of claim 1, wherein the relationship is determined at least in part prior to the commencement of the numerically controlled machining.

5. The method of claim 1, further comprising:
acquiring sensor data during the numerically controlled machining; and
adjusting the relationship or a model for calculating the force as a function of the sensor data.

6. The method of claim 5, further comprising:
determining a deviation of an actual position of the tool from a target position commensurate with the corrected toolpath as a function of the sensor data; and
adjusting the relationship or the model as a function of the deviation.

7. The method of claim 1, wherein the machine tool is embodied as a robot which is configured for guiding the tool for machining the workpiece.

8. The method of claim 1, wherein the interaction data are independent of the at least one machining configuration parameter.

9. The method of claim 1, wherein the interaction data are determined by intersecting of a simulated tool with a simulated workpiece.

10. The method of claim 9, wherein the intersecting comprises a Boolean operation.

11. The method of claim 9, wherein the interaction data are determined by identifying elements of the simulated workpiece that come into contact with or are cut by points of the simulated tool while the simulated tool is located in the section of the toolpath.

12. The method of claim 1, wherein an actual value of the machining configuration parameter is specified immediately prior to the numerically controlled machining and after determination of the interaction data.

13. The method of claim 1, wherein the at least one machining configuration parameter is changed during the numerically controlled machining.

14. The method of claim 1, wherein the at least one configuration parameter is measured or read out from a memory during the numerically controlled machining, in order to calculate the force during the numerically controlled machining.

15. A control system for numerically controlled machining of a workpiece with a tool of a machine tool and for computer-aided optimization of the numerically controlled machining, the control system comprising:
a first electronic computing device configured to determine interaction data that describe a geometric interaction of the tool with the workpiece in a section of a toolpath, and a second electronic computing device,
wherein at least one of the first and second electronic computing devices is configured to determine a relationship between a force to be expected during the numerically controlled machining and at least one machining configuration parameter based on the interaction data; and
wherein the second electronic computing device is configured to calculate the force during the numerically controlled machining based on the relationship and a current value of the at least one configuration parameter during the numerically controlled machining: to adjust the numerically controlled machining as a function of the calculated force by correcting the toolpath as a function of one or more stiffness values of the machine tool.

16. The control system of claim 15, wherein the second electronic computing device is configured to control the tool during the numerically controlled machining independently, without the first electronic computing device.

17. The control system of claim 15, wherein the first electronic computing device comprises a graphics processor unit for determining the interaction data.

18. A machine tool for numerically controlled machining of a workpiece, comprising:
a tool for machining of the workpiece, and
a control system comprising
a first electronic computing device configured to determine interaction data that describe a geometric interaction of the tool with the workpiece in a section of a toolpath, and a second electronic computing device,
wherein at least one of the first and second electronic computing devices is configured to determine a relationship between a force to be expected during the numerically controlled machining and at least one machining configuration parameter based on the interaction data; and
wherein the second electronic computing device is configured to calculate the force during the numerically controlled machining based on the relationship and a current value of the at least one configuration parameter during the numerically controlled machining; to adjust the numerically controlled machining as a function of the calculated force by correcting the toolpath as a function of one or more stiffness values of the machine tool.

19. The machine tool of claim 18, comprising
a computer-aided manufacturing system which comprises the first electronic computing device; and
a numerical controller which comprises the second electronic computing device.

20. A computer program stored on a non-transitory storage medium and comprising computer-readable commands which, when read into a memory of a computer system and executed by a processor of a control system for numerically controlled machining of a workpiece with a tool of a machine tool and for computer-aided optimization of the numerically controlled machining, causes the control system to:
prior to commencement of the numerically controlled machining, determine interaction data that describe a geometric interaction of the tool with the workpiece in a section of a toolpath;
based on the interaction data, determine a relationship between a force to be expected during the numerically controlled machining and at least one machining configuration parameter;
calculate the force during the numerically controlled machining based on the relationship and a current value of the at least one configuration parameter during the numerically controlled machining;

adjust the numerically controlled machining as a function of the calculated force by correcting the toolpath as a function of one or more stiffness values of the machine tool.

\* \* \* \* \*